(12) United States Patent
Augenstein et al.

(10) Patent No.: US 8,701,118 B2
(45) Date of Patent: *Apr. 15, 2014

(54) ADJUSTING THREAD PRIORITY TO OPTIMIZE COMPUTER SYSTEM PERFORMANCE AND THE UTILIZATION OF COMPUTER SYSTEM RESOURCES

(71) Applicant: International Business Machines Corporation, Armonk, NY (US)

(72) Inventors: Oliver Augenstein, Horgen (CH); Avishai H. Hochberg, San Jose, CA (US); Thomas Prause, Boeblingen (DE); Thorsten Schaefer, Mainz (DE)

(73) Assignee: International Business Machines Corporation, Armonk, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/794,100

(22) Filed: Mar. 11, 2013

(65) Prior Publication Data

US 2013/0326529 A1    Dec. 5, 2013

Related U.S. Application Data

(63) Continuation of application No. 12/873,572, filed on Sep. 1, 2010, now Pat. No. 8,683,472.

(30) Foreign Application Priority Data

Sep. 1, 2009  (DE) ................... 091 69 106

(51) Int. Cl.
    *G06F 9/46*    (2006.01)
(52) U.S. Cl.
    USPC ............... 718/103; 718/104; 718/105

(58) Field of Classification Search
    USPC .............................. 718/103, 104, 105
    See application file for complete search history.

(56) References Cited

U.S. PATENT DOCUMENTS

2003/0115118 A1   6/2003  Reinemann
2008/0163240 A1   7/2008  Aguilar et al.

OTHER PUBLICATIONS

Office Action for U.S. Appl. No. 12/873,572 (Augenstein et al., "Method and infrastructure for optimizing the utilization of computer system's resources," filed Sep. 1, 2010), U.S. Patent and Trademark Office, mailed May 9, 2013, 12 page.

IBM, "General Purpose Bottleneck Analysis for Distributed Data Movement Applications," IP.com, Aug. 4, 2006, pp. 1-5, IPCOM000138798D, http://www.ip.com/pubview/IPCOM/000138798D.

*Primary Examiner* — Meng An
*Assistant Examiner* — Blake Kumabe
(74) *Attorney, Agent, or Firm* — VanLeeuwen & VanLeeuwen; Libby Z. Toub

(57) ABSTRACT

The present invention optimizes the utilization of computer system resources by considering predefined performance targets of multithreaded applications using the resources. The performance and utilization information for a set of multithreaded applications is provided. Using the performance and utilization information, the invention determines overutilized resources. Using the performance information, the invention also identifies threads and corresponding applications using an overutilized resource. The priority of the identified threads using said overutilized resource is adjusted to maximise a number of applications meeting their performance targets. The adjustments of priorities are executed via a channel that provides the performance and utilization information.

7 Claims, 7 Drawing Sheets

ADJUSTING THREAD PRIORITY TO OPTIMIZE COMPUTER SYSTEM PERFORMANCE AND THE UTILIZATION OF COMPUTER SYSTEM RESOURCES

BACKGROUND OF THE INVENTION

1. Field of the Invention

In general, the present invention relates to optimizing the performance of applications running on a computer system. More particularly, the present invention relates to optimizing the utilization of a computer system's resources considering predefined performance targets of applications using said resources. Still more particularly, the present invention applies especially to applications, as for example, distributed data movement applications, comprising several independently executable tasks, wherein each task comprises at least one thread and each thread uses mainly one resource. Further, the present invention assumes that performance information on thread level is provided for each of these applications and that utilization information of the computer system's resources is available.

2. Description of the Related Art

It is well known in the art that most applications use several different resources during execution. A backup/restore client application, for example, comprises the independently executable tasks of reading data from a storage device, performing a data compression, and sending the data over a network to a server component. Each of these processes uses one particular resource, which determines the performance of this process. So, the most important characteristics for the performance of reading data are speed and throughput of the storage device, although the CPU is utilized as well for reading data.

Usually, the utilization of the different resources varies depending on the number and priorities of applications accessing said resources. This may result in an overutilization of some resources, impacting the performance of those applications using an overutilized resource.

The Application Response Measurement (ARM) standard describes a procedure to determine the utilization of resources or the duration of transactions used or processed by a data manipulation process. This measurement of the utilization or the transaction times is initiated by the application itself. However, the ARM standard covers measurement only. The usage of this utilization information is not part of the standard. Instead, workload managers, like IBM Workload Manager or IBM Enterprise Workload Manager (WLM/eWLM), make use of these values to control external schedulers for some resources. State of the art schedulers need permanent and dynamic adjustment. They are only able to prioritize applications, but can not prioritize single threads or tasks within an application (see FIG. 1).

A starting point for the present invention is an infrastructure and a monitoring mechanism as described in "IPCOM000138798D". The central module of this infrastructure is a Performance Monitor Interface providing performance measurement capabilities to the applications to be monitored. To collect detailed performance information, this interface measures the runtime of each particular thread within an application during the process flow. The results of these measurements are monitored by a central monitoring component, serving as a User Interface. By correlating this information and in consideration of the total process duration, it is possible to draw conclusions about the whole system environment concerning performance and utilization.

BRIEF SUMMARY OF THE INVENTION

The present invention optimizes the utilization of computer system resources by considering predefined performance targets of multithreaded applications using the resources. The performance and utilization information for a set of multithreaded applications is provided. Using the performance and utilization information, the invention determines overutilized resources. Using the performance information, the invention also identifies threads and corresponding applications using an overutilized resource. The priority of the identified threads using said overutilized resource is adjusted to maximise a number of applications meeting their performance targets. The adjustments of priorities are executed via a channel that provides the performance and utilization information.

BRIEF DESCRIPTION OF THE SEVERAL VIEWS OF THE DRAWINGS

The novel features of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
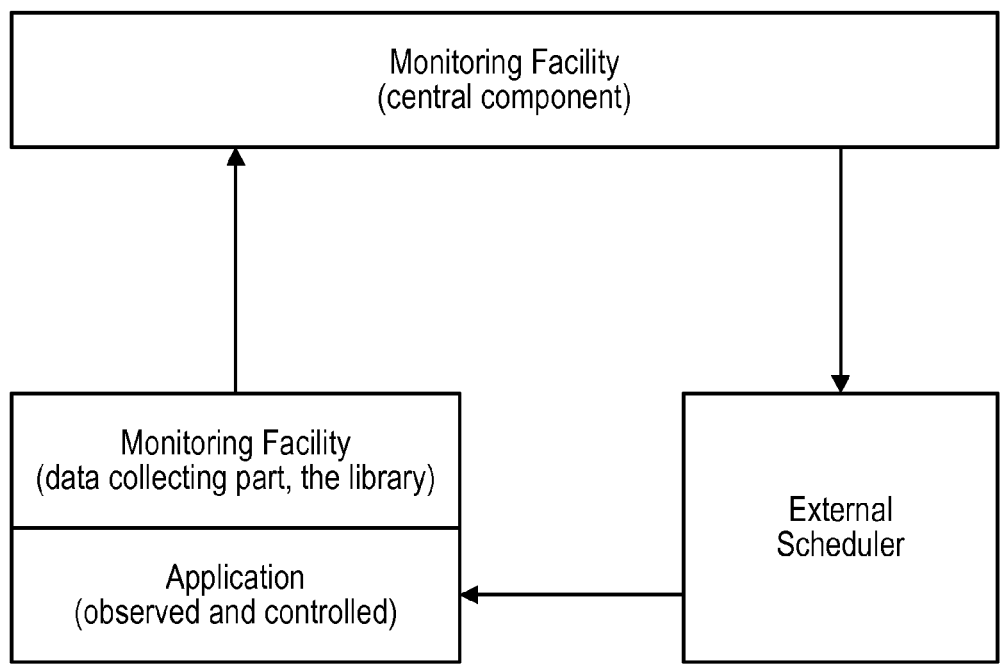
FIG. 1 shows the prior art external scheduler.

According to the present invention, the claimed method for optimizing the utilization of a computer system's resources, considering predefined performance targets of applications using said resources, where the applications' performance information on thread level together with the utilization information of the resources is used to determine overutilized resources. The performance information is used to identify all threads and corresponding applications using an overutilized resource. Then, the priority of said identified threads using said overutilized resource is varied to maximise the number of applications meeting their performance targets.

In one preferred embodiment, a central monitoring component collects and analyses the performance and utilization information to determine overutilized resources and to identify all threads and corresponding applications using an overutilized resource, and to automatically vary the priority of said identified threads by scheduling said threads to maximise the number of applications meeting their performance targets.

The invention uses the same channel that collects the performance information of applications on thread level and utilization information of the resources used by these applications to perform an adjustment of the priority of threads competing for an over utilized resource. The monitoring facility collects performance data of the application, (e.g., transaction times, throughput, CPU utilization) and sends this information via the channel to the central component of the monitoring facility. The central component of the monitoring facility can send adjustment actions via channel to the monitoring facility which performs the required adjustments to application. The adjustments are executed within the next monitoring cycle. The adjustment of priority is done considering the performance targets of the corresponding applications. So a process of an application with lower priority can be throttled, when using an overutilized resource, to privilege the competing process of an application with higher priority. The present invention even allows to trade threads or tasks against each other, which belong to one and the same application and compete for an over utilized resource, to improve the performance of said application. One major advantage of the present invention is that it allows adjustment of the performance and priority of applications regarding multiple different resources without adjusting the corresponding external schedulers, which are only able to prioritize applications as a whole. This strategy results in better overall resource utilization than the state of the art technology using external schedulers for the different resources.

The present invention may be used in addition to such external state of the art schedulers, in cases where a scheduler can not be adjusted. The present invention can be used for resources, e.g., networks, which are not capable of scheduling. Usually, data to be sent over a network is prioritized using Quality of Service (QOS) concepts, which provide each data package with a flag indicating, if this data package should be handled with higher priority than others, or to guarantee a certain transfer time.

The invention uses an infrastructure which gathers performance information on thread level for each application running on the same system or multiple distributed systems and utilization information for the resources used by the applications. This is done by a single application programming interface (API) call. According to the invention, this API call also initiates an analysis of this information to automatically vary the priority of threads using an overutilized resource. Therefore, the claimed infrastructure includes a central monitoring component 1 that uses information about the importance of the monitored applications, i.e. their performance targets, to decide which thread may be throttled whenever a global resource limit is reached.

The same infrastructure is used to adjust the priorities of the observed applications and/or threads. FIG. 2B describes how the adjustment actions are executed to the application. This is achieved by delaying the application and/or thread of the application while it is passing the performance information to the monitoring infrastructure. In a preferred embodiment of the present invention, the monitored applications call functions of the monitoring infrastructure to allow the collection of the performance information. Applications and/or threads that are considered to heavily utilize a certain resource while still fulfilling the performance targets are delayed in their execution while passing the performance information to the monitoring infrastructure 3. This is achieved by stopping the execution of the actual thread of an observed application while it delivers the performance data to the monitoring infrastructure.

In the context of the present invention, the actual performance of applications running on a computer system can easily be observed by monitoring and analysing the corresponding thread level performance information. Thus, it is possible to determine, whether such an application fulfils its performance target and to value its performance.

In a preferred embodiment of the present invention, overutilized resources are identified using the available performance information of applications which do not fulfil their performance targets. As the performance information is provided on thread level, it identifies the threads limiting the performance of an application and the resources mainly used by these threads. Together with the utilization information of these resources it is, then, possible to determine whether a resource is actually overutilized, thus, impacting the application performance.

Once having identified an overutilized resource, the applications' performance information is used to determine all threads and corresponding applications using the overutilized resource.

There are several strategies and ways to vary the priority of threads using an overutilized resource according to the present invention. In a preferred embodiment, the performance information of each application using an overutilized resource is considered with respect to the corresponding performance target, to decide whether the thread mainly using the overutilized resource can be throttled. A thread to be throttled should belong to an application which fulfils its performance target. Even better results are achievable when throttling only threads of applications which overfulfil their performance target by a predefined percentage. The thread limiting the performance of an application and the thread to be throttled to improve said application's performance should belong to different tasks, to avoid undesirable side effects.

Advantageously, a thread is throttled by simply delaying it. The delay of a particular thread or process can be chosen on arbitrary granularity or time slice. In some cases, it may be of benefit to do this on relatively large time slices, because each switching between two processes, which compete for one resource, consumes time and resource capacity for the switching itself. Avoiding switching results in a higher performance, e.g., in a reduced transaction time. State of the art schedulers use quite fine time slices to make sure interactive processes look to the user as running continuously. Differently, the present invention allows a coarse grained scheduling for selected non-interactive processes, e.g., delaying/stopping the process for 1 sec within a time frame of 10 sec, instead of delaying it 500 times for 20 msec in the same time frame. Thereby, the infrastructure of a computer system, e.g., caches, is utilized much more efficiently. To further increase the efficiency of the whole system the delay may be increased gradually as long as the corresponding application fulfils or overfulfils its performance target and as long as the resource mainly used by said thread is overutilized.

In a preferred embodiment of the present invention, the delay of a thread is recorded as adjustment information associated with the application having initiated this adjustment. Thus, adjustments can easily be reset, for example, in a case where the application having initiated these adjustments has finished.

As the utilization of the different resources is usually varying, a resource may only be overutilized for a certain period of time but may have unused capacities afterwards. That is why the throttling of a process using said resource may be reasonable for a certain period of time, but is dispensable afterwards. To take advantage of this aspect when optimizing the utilization of resources, a preferred embodiment of the present invention also handles the case where an application does overfulfil its performance target. In this case, the adjustment information mentioned above is used to reduce the adjustments, i.e. the delays, imposed on other applications. Thus, an optimal utilization of resources is approximated.

One core idea of the present invention is to use the same channel that is used to collect the performance information to trade independent application processes, which are competing for the same over utilized resource, against each other.

The invention preferably uses the same channel that collects the performance information of applications on thread level and utilization information of the resources used by these applications to perform an adjustment of the priority of threads competing for an overutilized resource.

Figure 2A:
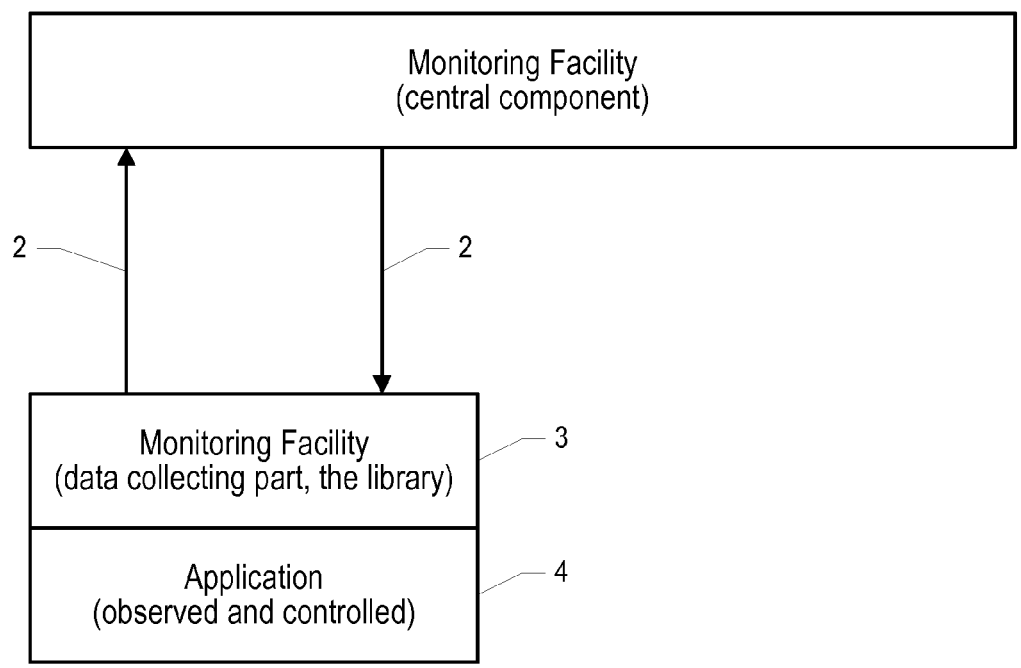
FIG. 2A shows a diagram illustrating the basic inventive concept using the same channel for performance monitoring and adjustment actions.
Figure 2B:
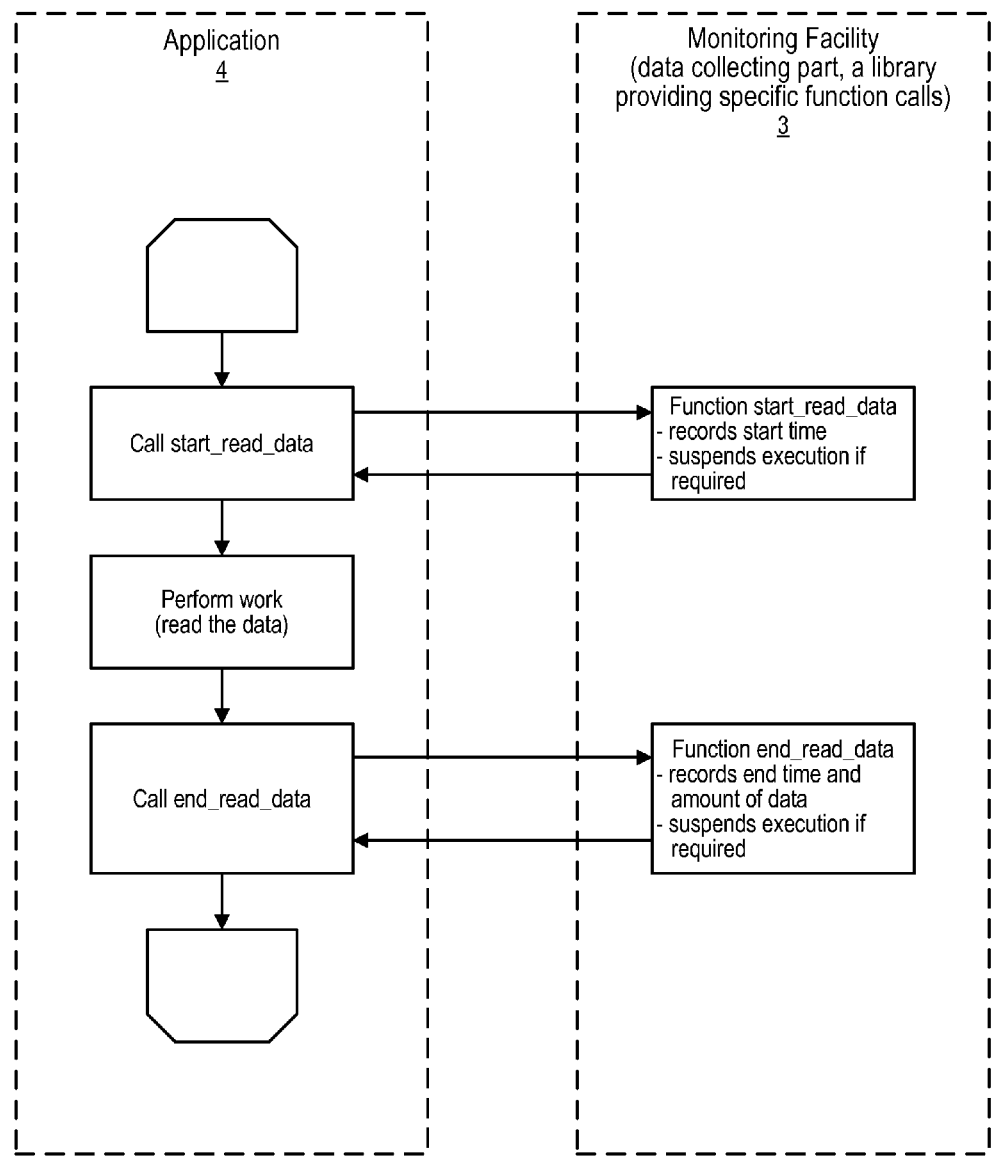
FIG. 2B shows a flowchart illustrating how the adjustments are executed by delaying a thread.

FIG. 2A shows the basic inventive channel concept. The monitoring facility 3 collects performance data of the application 4, (e.g., transaction times, throughput, CPU utilization) and sends this information via the channel 2 to the central component of the monitoring facility 1. The central component of the monitoring facility 1 can send adjustment actions as explicitly described to FIG. 2B via channel 2 to the monitoring facility 3 which performs the required adjustments to application 4. The adjustments are executed within the next monitoring cycle. The adjustment of priority is done considering the performance targets of the corresponding applications. So a process of an application with lower priority can be throttled, when using an overutilized resource, to privilege the competing process of an application with higher priority. The present invention even allows to trade threads or tasks against each other, which belong to one and the same application and compete for an overutilized resource, to improve the performance of the application. One major advantage of the present invention is that it allows adjustment of the performance and priority of applications regarding multiple different resources without adjusting the corresponding external schedulers, which are only able to prioritize applications as a whole. This strategy results in much better overall resource utilization than the state of the art technology using external schedulers for the different resources.

The present invention may be used in addition to such external state of the art schedulers, in cases where a scheduler can not be adjusted. The present invention can be used for resources, e.g., networks, which do not know scheduling. Usually, data to be sent over a network is prioritized using Quality of Service (QOS) concepts, which provide each data package with a flag indicating, if this data package should be handled with higher priority than others, or to guarantee a certain transfer time.

The invention uses an infrastructure which gathers performance information on thread level for each application running on the same system or multiple distributed systems and utilization information for the resources used by said applications. This is done by a single application programming interface (API) call. According to the invention, this API call also initiates an analysis of this information to automatically vary the priority of threads using an over utilized resource. Therefore, the claimed infrastructure 1, 2, 3 includes a central monitoring component 1 that uses information about the importance of the monitored applications 4, i.e. their performance targets, to decide which thread may be throttled whenever a global resource limit is reached.

The same infrastructure 1, 2, 3 is used to adjust the priorities of the observed applications and/or threads. FIG. 2B describes how the adjustment actions are executed to the application 4. This is achieved by delaying the application 4 and/or thread of the application while it is passing the performance information to the monitoring infrastructure 3. In a preferred embodiment of the present invention, the monitored applications 4 call functions of the monitoring infrastructure 3 to allow the collection of the performance information. Applications 4 and/or threads that are considered to heavily utilize a certain resource while still fulfilling the performance targets are delayed in their execution while passing the performance information to the monitoring infrastructure 3. This is achieved by stopping the execution of the actual thread of an observed application 4 while it delivers the performance data to the monitoring infrastructure 3.

In the context of the present invention, the actual performance of applications running on a computer system can easily be observed by monitoring and analysing the corresponding thread level performance information. Thus, it is possible to determine, whether such an application fulfils its performance target and to value its performance.

Figure 3:
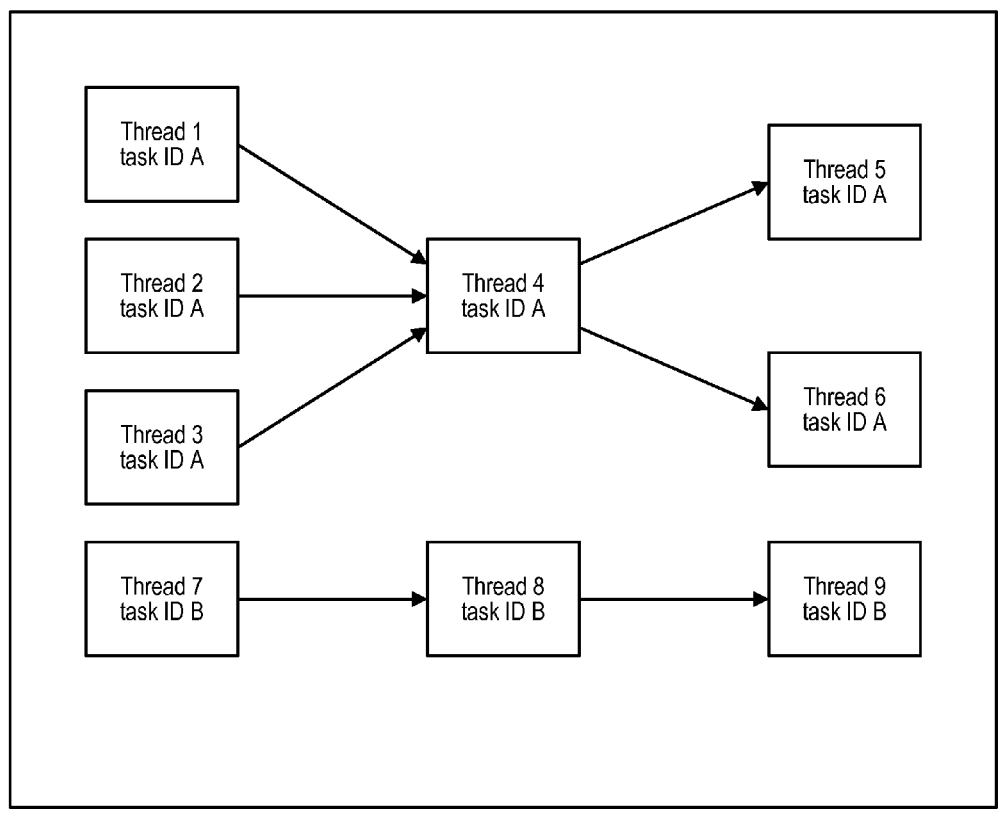
FIG. 3 shows a diagram illustrating the dependencies between threads and tasks of an application.

To identify independent processes or tasks of an application the present invention uses a structure as shown in FIG. 3. This embodiment assumes that each application consists of a number of threads, wherein each thread mainly uses only one particular resource. The threads of an application are grouped according to their interdependencies, wherein each group of interdependent threads forms an independent task of that application.

The invention proposes to enhance the central component to be able to specify certain performance targets for threads and/or resources. Furthermore, it proposes to use the same channel that is used to receive the performance data to send the control information (how long a specific thread should be suspended from execution) back to the data collecting part (which performs the adjustment of the threads).

The application structure, exemplarily shown in FIG. 3, comprises Thread 1 to Thread 9. The arrows indicate the dependencies between Threads 1 to 9. Accordingly, Thread 5 and Thread 6 depend on Thread 4, which in turn depends on Thread 1, 2 and 3. Similarly, Thread 9 depends on Thread 8 which depends on Thread 7. As all interdependent threads belong to the same task, a first task with task ID A is formed by Thread 1 to 6, while thread 7 to 9 form another independent task with task ID B.

Figure 4:
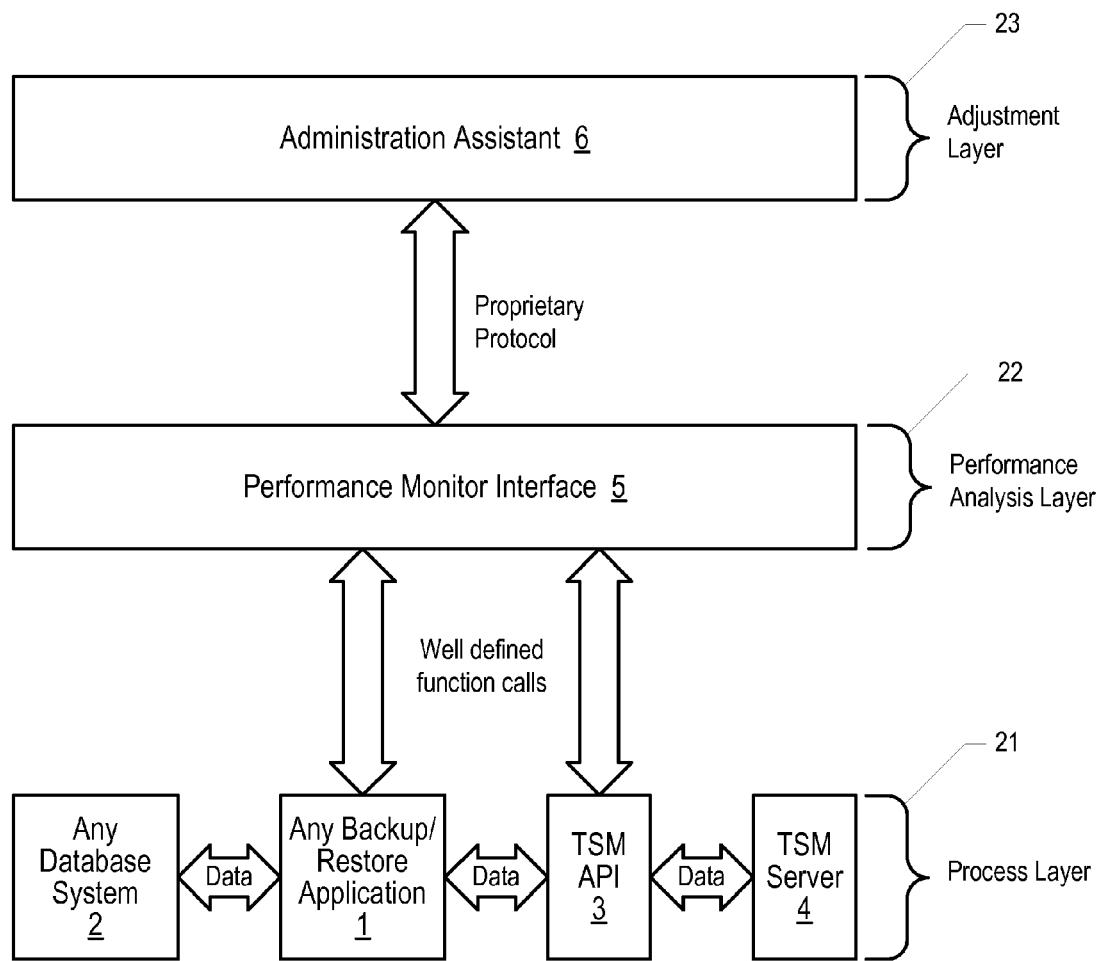
FIG. 4 shows an infrastructure according to the present invention for optimizing the utilization of a computer system's resources for a data movement application.

Returning to the example of a backup/restore client application, mentioned above, FIG. 4 shows an infrastructure 20 which allows retreival of performance information on thread level from such an application. Thread level performance information is necessary for optimizing the utilization of a computer system's resources according to the present invention. The infrastructure 20 comprises three layers: a process layer 21, a performance analysis layer 22 and an adjustment layer 23.

The backup/restore application 1 belongs to the process layer 21 which illustrates the use of resources and the data flow connected with said application 1. First, application 1 accesses a database system 2 to read data from a disk storage device. Then, after having performed some data manipulation, e.g., data compression, application 1 sends the data over a TSM API network 3 to a TSM server 4. So, application 1 uses three different resources—a disk subsystem, CPU and a network.

The performance analysis layer 22 is represented by a performance monitor interface 5 providing performance measurement capability to the backup/restore application 1. The main idea behind this interface is to measure the time periods the different threads within the process flow are running. The backup application read call, for example, may therefore be enclosed with the two functions, startDiskAccess and stopDiskAccess. Thus, it is possible to get information about the disk subsystem performance. The other performance critical threads are observed in the same way.

The adjustment layer 23 is represented by an administration assistant 6. This component collects and analyses the performance information provided by the performance monitor interface 5 in connection with information about the utilization of the system's resources. Thus, it determines overutilized resources, identifies all threads and corresponding applications using an overutilized resource, and varies the priority of said identified threads by scheduling said threads to maximise the number of applications meeting their performance targets. This will be explained in detail in connection with the flowchart of FIG. 3.

Figure 5:
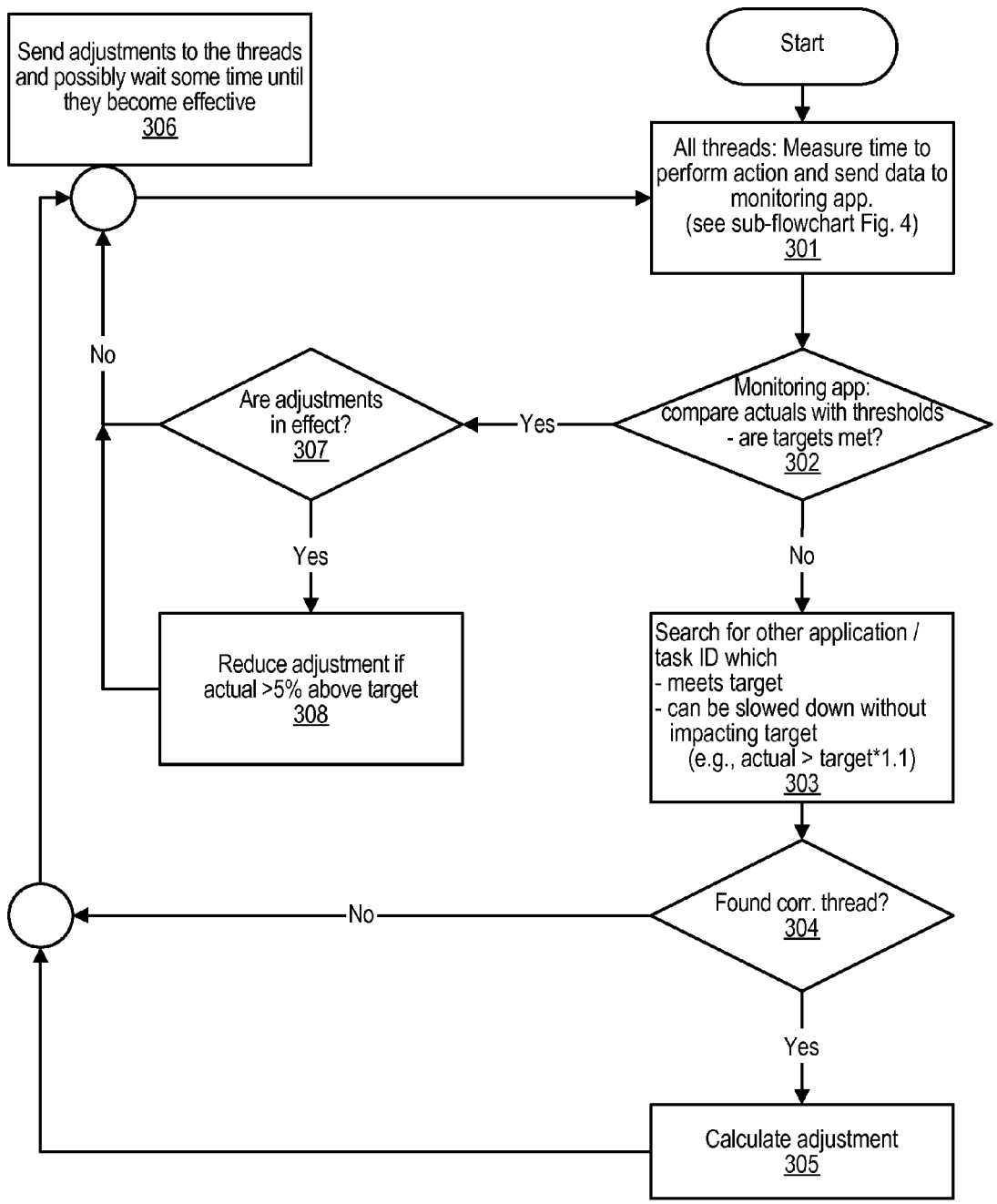
FIG. 5 shows a flowchart illustrating a process for optimizing the utilization of a computer system's resources considering predefined performance targets of applications using said resources according to the present invention.

Process 300, illustrated in FIG. 5, represents a preferred embodiment of the present invention. It uses the measured time necessary to perform the separate threads of each application as actual performance information to optimize the utilization of a computer system's resources considering predefined performance targets of said applications using said resources. This actual thread level performance information is retrieved in step 301, which will be explained in detail in connection with FIG. 5. In step 302, a monitoring application analyses the actual thread level performance information to determine the actual performance of an application and to compare this actual application performance with the application's performance targets.

In case that these targets are not met, process 300 continues with step 303, where the thread level performance information of the application is analysed to determine the bottleneck, i.e. the thread, which needs a disproportional amount of the performance time. Then, the utilization information of the corresponding resource is analysed to determine whether this resource is overutilized. If it is considered overutilized, the performance information of all applications using said resource is analysed and compared to the corresponding performance targets to decide whether the respective threads using said overutilized resource can be throttled. In a preferred embodiment of the invention, these threads belong to an application which overfulfils its performance target by a predefined percentage. In this preferred embodiment, the thread limiting the performance and the thread to be throttled belong to different tasks.

If such a thread is found in step 304, an adjustment in the form of a delay is calculated in step 305 and recorded as adjustment information associated with the application having initiated this adjustment. Then, it is sent to the thread in step 306. The delay is reflected in step 301, which will be explained in detail in connection with FIG. 6. Thus, the priority of threads using an overutilized resource is varied to maximise the number of applications meeting their performance targets.

In case that an application does meet its performance target or even overfulfils it by a predefined percentage, process 300 flows from step 302 to step 307, to check whether there are any adjustments in effect, that have been initiated by said application. Therefore, process 300 uses the recorded adjustment information. If there is any throttling of other applications initiated by said application, this throttling is reduced in step 308 and the adjustment information is modified accordingly. Then, process 300 continues with step 306 by sending the reduction to the respective thread.

Figure 6:
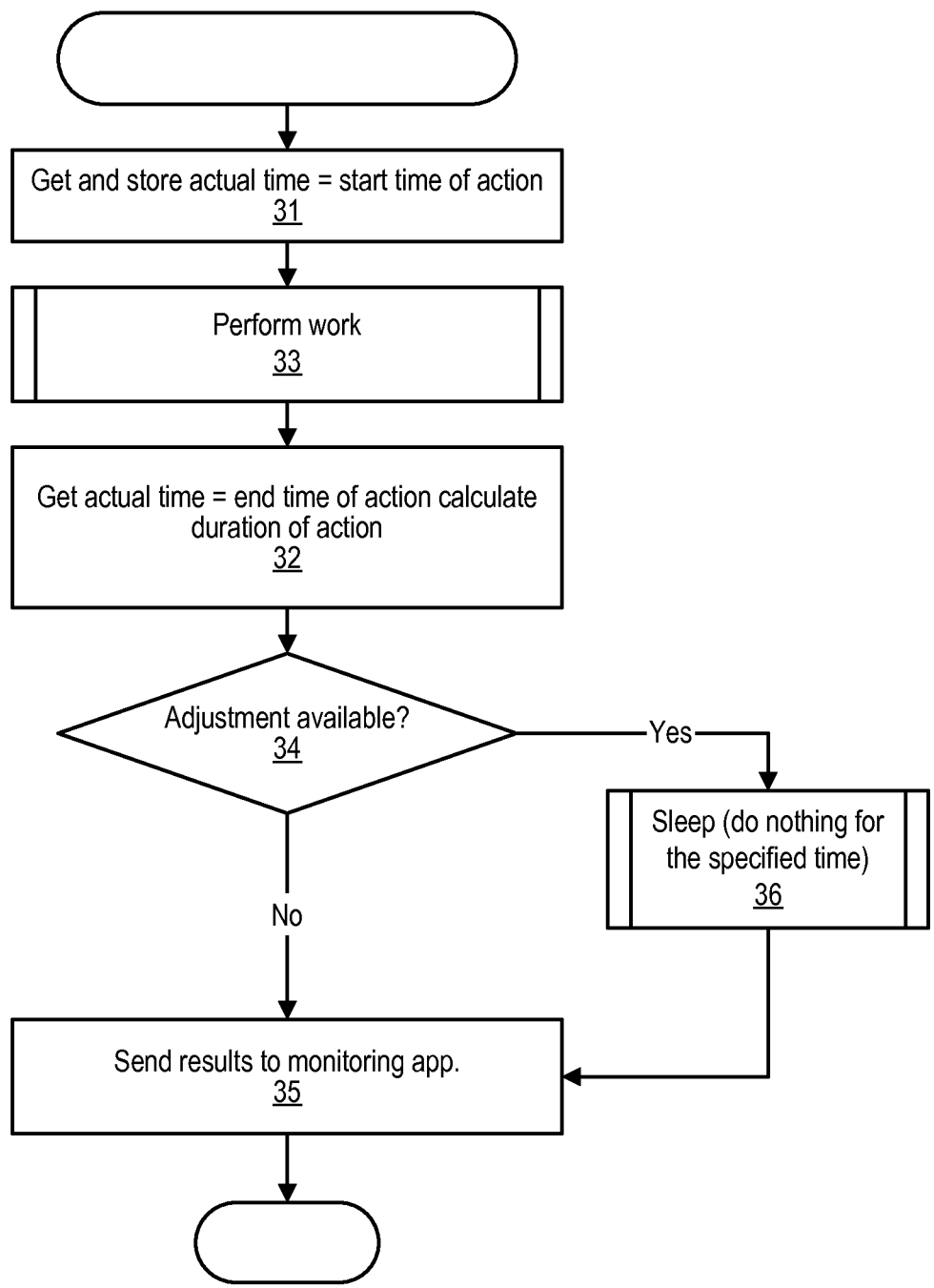
FIG. 6 shows a flowchart illustrating a process for collecting information about the performance of an application on thread level and scheduling single threads.

The flowchart of FIG. 6 illustrates that thread processing and monitoring is interwoven such that step 301 of process 300 comprises not only monitoring aspects but also scheduling aspects.

As already mentioned above, thread level performance information is retrieved by enclosing each thread 33 with two "get actual time" commands 31 and 32, wherein the actual time retrieved from step 31 is considered as start time and the actual time retrieved from step 32 is considered as end time. Thus, the actual processing time for a thread 33 is calculated in step 32 after having performed said thread 33. In the following step 34 it is checked whether an adjustment is available for said thread 33. If not, the calculated processing time is sent to the monitoring application in step 35. In case that an adjustment is available for said thread 33, further processing is delayed according to that adjustment in step 36. Thus, the adjustments determined in steps 305 and 308 and sent to the threads in step 306 of process 300 are accomplished in step 35 which is part of step 301 of process 300.

The invention claimed is:

1. A method comprising:
    receiving one or more performance measurements for a plurality of multithreaded applications, each multithreaded application comprising a plurality of independently executable tasks, each task comprising a plurality of threads and each thread using one or more resources, and one or more utilization measurements for the resources used by the threads of the plurality of multithreaded applications, wherein the received performance measurements comprise processing times for the plurality of multithreaded applications and the processing times for the threads of the applications;
    determining that a processing time of a first application of the plurality of multithreaded applications does not meet a first performance target;
    determining that a first thread of the first application needs a disproportional amount of processing time;
    determining that a first resource used by the first thread is overutilized;
    determining a second thread that uses the first resource, wherein the first thread and the second thread belong to different tasks; and
    in response to determining the second thread, throttling the second thread by adjusting a priority of the second thread.

2. The method of claim 1, wherein adjusting the priority of the second thread comprises delaying the second thread.

3. The method of claim 2, further comprising:
    recording a delay time for the second thread as adjustment information corresponding to the first application.

4. The method of claim 1, wherein the second thread belongs to a second task, and wherein the second task overfulfills a second performance target by a predefined percentage.

5. The method of claim 1, wherein the second thread belongs to a second application, and wherein the second application overfulfills a second performance target by a predefined percentage.

6. The method of claim 5, further comprising:
    in response to determining that the second application continues to overfulfill the second performance target and that the first resource continues to be overutilized, increasing a delay time for the second thread.

7. The method of claim 6, further comprising:
    recording the delay time for the second thread as adjustment information corresponding to the first application.

* * * * *